United States Patent
Kamalakantha et al.

(10) Patent No.: US 10,816,976 B2
(45) Date of Patent: Oct. 27, 2020

(54) CONTROL AERIAL MOVEMENT OF DRONE BASED ON LINE-OF-SIGHT OF HUMANS USING DEVICES

(71) Applicant: ENT. SERVICES DEVELOPMENT CORPORATION LP, Houston, TX (US)

(72) Inventors: Chandra H. Kamalakantha, Plano, TX (US); Parag Doshi, Marietta, GA (US)

(73) Assignee: ENT. SERVICES DEVELOPMENT CORPORATION LP, Houston, TX (US)

( * ) Notice: Subject to any disclaimer, the term of this patent is extended or adjusted under 35 U.S.C. 154(b) by 350 days.

(21) Appl. No.: 15/739,589

(22) PCT Filed: Jun. 24, 2015

(86) PCT No.: PCT/US2015/037428
§ 371 (c)(1),
(2) Date: Dec. 22, 2017

(87) PCT Pub. No.: WO2016/209225
PCT Pub. Date: Dec. 29, 2016

(65) Prior Publication Data
US 2018/0314251 A1    Nov. 1, 2018

(51) Int. Cl.
*G05D 1/00* (2006.01)
*G08C 17/00* (2006.01)
(Continued)

(52) U.S. Cl.
CPC ......... *G05D 1/0088* (2013.01); *B64C 39/024* (2013.01); *G05D 1/0094* (2013.01);
(Continued)

(58) Field of Classification Search
CPC .... G05D 1/0088; G05D 1/0094; G08C 17/02; G08C 17/00; G08C 2201/51;
(Continued)

(56) References Cited

U.S. PATENT DOCUMENTS 9,265,450 B1 *  2/2016  Giobbi ............... G06K 19/0718
9,269,252 B2 *  2/2016  Mroszczak ........ G08B 21/0446
(Continued)

FOREIGN PATENT DOCUMENTS

EP          2083341        7/2009
WO       2013163746      11/2013

OTHER PUBLICATIONS

Panagiotis Theodorakopoulos. On autonomous target tracking for UAVs. Automatic. Université Paul Sabatier—Toulouse III, 2009. English. tel-00392776 (Year: 2009).*

(Continued)

*Primary Examiner* — Nicholas Kiswanto
(74) *Attorney, Agent, or Firm* — Sheppard Mullin Richter & Hampton LLP

(57) ABSTRACT

Examples disclosed herein relate to control of a drone. In one example, aerial movement of the drone is controlled. In the example, it is determined, based on a plurality of devices, whether the drone is within a line-of-sight with at least a respective one of a plurality of humans within a physical proximity to a respective one of a the devices. In the example, the devices are used by the drone to track the humans. In the example, when the drone is determined to lack the line-of-sight, aerial movement of the drone is controlled to move the drone to become within the line-of-sight.

18 Claims, 4 Drawing Sheets

(51) Int. Cl.
*G08C 17/02* (2006.01)
*B64C 39/02* (2006.01)

(52) U.S. Cl.
CPC .............. *G08C 17/00* (2013.01); *G08C 17/02* (2013.01); *B64C 2201/127* (2013.01); *B64C 2201/128* (2013.01); *B64C 2201/14* (2013.01); *B64C 2201/145* (2013.01); *G08C 2201/51* (2013.01); *G08C 2201/93* (2013.01)

(58) Field of Classification Search
CPC .............. G08C 2201/93; B64C 39/024; B64C 2201/14; B64C 2201/145; B64C 2201/128; B64C 2201/127
See application file for complete search history.

(56) References Cited

U.S. PATENT DOCUMENTS

| | | | |
|---|---|---|---|
| 9,529,447 B2* | 12/2016 | Hodges | G06F 1/1632 |
| 9,754,425 B1* | 9/2017 | Iqbal | G07C 5/008 |
| 2004/0230372 A1 | 11/2004 | Chang | |
| 2009/0187299 A1 | 7/2009 | Fregene | |
| 2012/0210853 A1 | 8/2012 | Abershitz | |
| 2014/0277854 A1 | 9/2014 | Jones | |
| 2015/0054639 A1* | 2/2015 | Rosen | H04M 3/2281 340/439 |
| 2015/0134143 A1 | 5/2015 | Willenborg | |
| 2015/0344136 A1* | 12/2015 | Dahlstrom | B64C 39/024 701/3 |
| 2015/0346722 A1* | 12/2015 | Herz | G05D 1/0027 701/2 |
| 2015/0350614 A1* | 12/2015 | Meier | G06K 9/0063 348/144 |

OTHER PUBLICATIONS

International Application No. PCT/US2015/037428, International Search Report and Written Opinion dated Apr. 29, 2016.
European Patent Application No. 15896516.0, Search Report dated Dec. 13, 2018.

* cited by examiner

CONTROL AERIAL MOVEMENT OF DRONE BASED ON LINE-OF-SIGHT OF HUMANS USING DEVICES

CROSS-REFERENCE TO RELATED APPLICATIONS

This application is a national stage application pursuant to 35 U.S.C. § 371 of International Application No. PCT/US2015/037428, filed Jun. 24, 2015, the disclosure of which is hereby incorporated by reference herein.

BACKGROUND

Drones are unmanned aerial vehicles. Some drones can be controlled autonomously by onboard computers while other drones can be controlled via remote control or other means. Drones can be used for a wide array of functionality, from recreational use to commercial use to military use.

BRIEF DESCRIPTION OF THE DRAWINGS

The following detailed description references the drawings, wherein.

DETAILED DESCRIPTION

Figure 1:
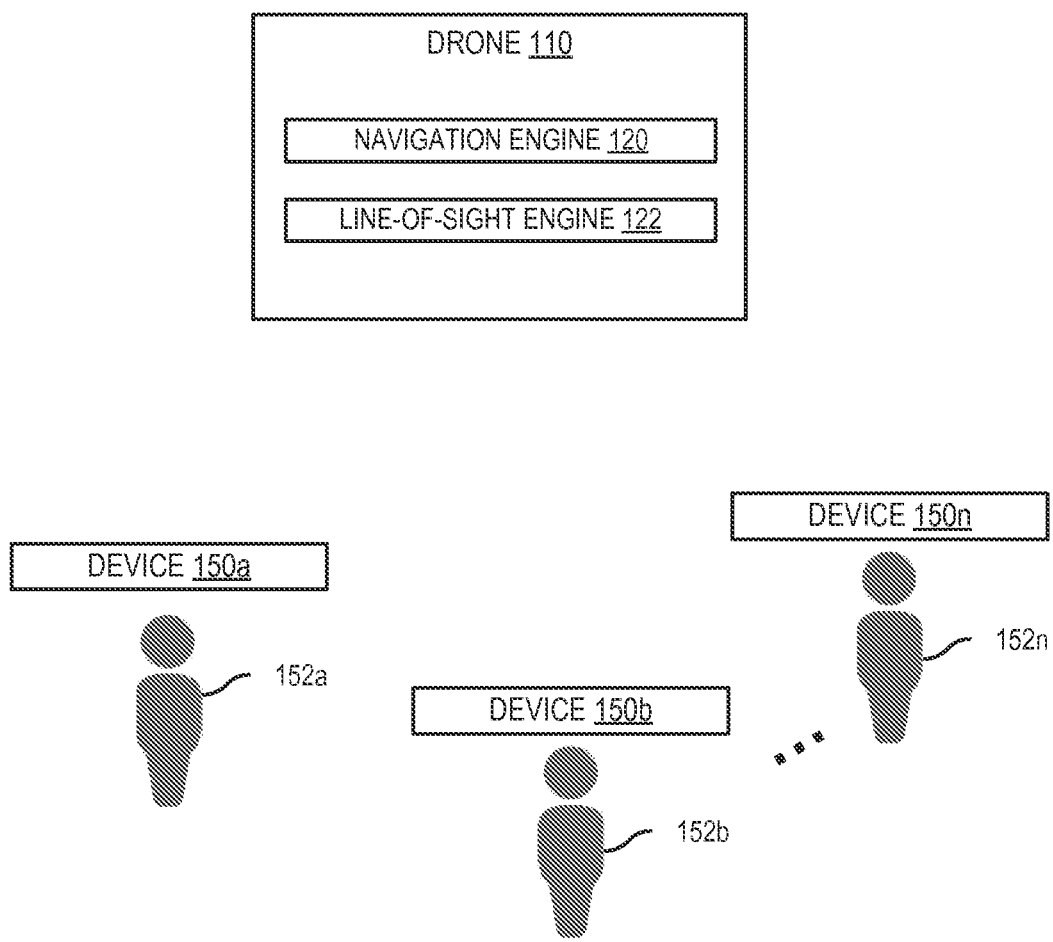
FIG. 1 is a system including a drone capable of tracking humans based on devices and control the drone to be within line-of-sight of at least one of the devices, according to an example.

Recent development of drones unlocks a number of opportunities to better life for mankind. Drones can be used for various functions, such as helping optimize crop yield on a farm, monitoring children at a school, monitoring prison inmates, recreation, etc.

Tracking individual humans with drones can be useful for various reasons. For example, parents may prefer to know the whereabouts of their children. Individuals may be concerned about their elderly parents or loved ones and may wish to track them, with their consent. Further, people may be more comfortable using a car service if a drone tracking system was able to confirm their whereabouts.

Governments may decide to provide safety rules for usage of drones. For example, governments may choose to make a rule to require line-of-sight from a human being to the drone, may require that an operator be able to control the drone, make a rule to limit speed of the drone, provide rules for the altitude of the drone, limit particular airspace, etc.

Drones can include multiple sensors. Further, people can have devices (e.g., wearable devices) within a threshold proximity that can help the drone track and monitor the people. Moreover, the devices can also be used to confirm line-of-sight between a human being and a drone. In some examples, information from drones and the devices can be sent to a computing system (e.g., a cloud computing system). The computing system can be used to provide tracking alerts or other services from information provided by the drones and/or wearable devices.

In some examples, an entity that controls the drone can use a controlling device, such as a handheld controller with communication to the drone, a mobile phone, another wearable device, etc. to communicate with the drone to control the drone. Further, in some examples, the communication can be routed (e.g., via the Internet) to the drone. Moreover, in some examples, the computing system can be used to control the drone via a communication infrastructure (e.g., using cellular communications).

In some examples, sensory information can be collected from the devices associated with humans and the drones to allow the computing system to provide services. For example, a cloud-based application can provide an information hub for subscribers. People can register their devices to the service. When certain conditions are met (e.g., the device is on and at a particular location), the device can provide information to the computing system. The computing system can also coordinate with the drones. Thus, the computing system can act as an information hub allowing for processing of the data to provide services, such as notifications, data retention (e.g., via video from the drone, location of the drone, location information about the devices from the drone and/or the devices themselves, etc.). Moreover, alerts can be integrated into existing systems via an Application Programming Interface (API). Example systems can include emergency management systems (EMS) such as Amber Alert or other emergency notification systems. As such, if the drone is tracking a child at a school and the child is moved outside of a boundary associated with the school, the drone can follow the child and an alert can go out (e.g., to the parent, the school, an entity controlling the drone, combinations thereof, etc.). Similar integrations can occur for proprietary systems (e.g., an alert to a prison guard for a prison security context).

FIG. 1 is a system including a drone capable of tracking humans based on devices and control the drone to be within line-of-sight of at least one of the devices, according to an example. The system 100 can include a drone 110 that communicates with devices 150a-150n. Communications can occur via a communication network (e.g., via network connections, via the Internet, using cell technologies, etc.), transmissions from the devices to and from the drone (e.g., using radio frequency transmissions), etc. In certain examples, the drone 110 includes components to perform aerial movement, sensors, and computing components. For example, a navigation engine 120 can be used to control movement of the drone 110. Further, the line-of-sight engine 122 can use sensor information to determine whether each of the devices 150a-150n associated with respective humans 152a-152n and/or the humans 152a-152n are within line-of-sight. The use of sensors can be used for various activity by the drone 110.

Figure 2:
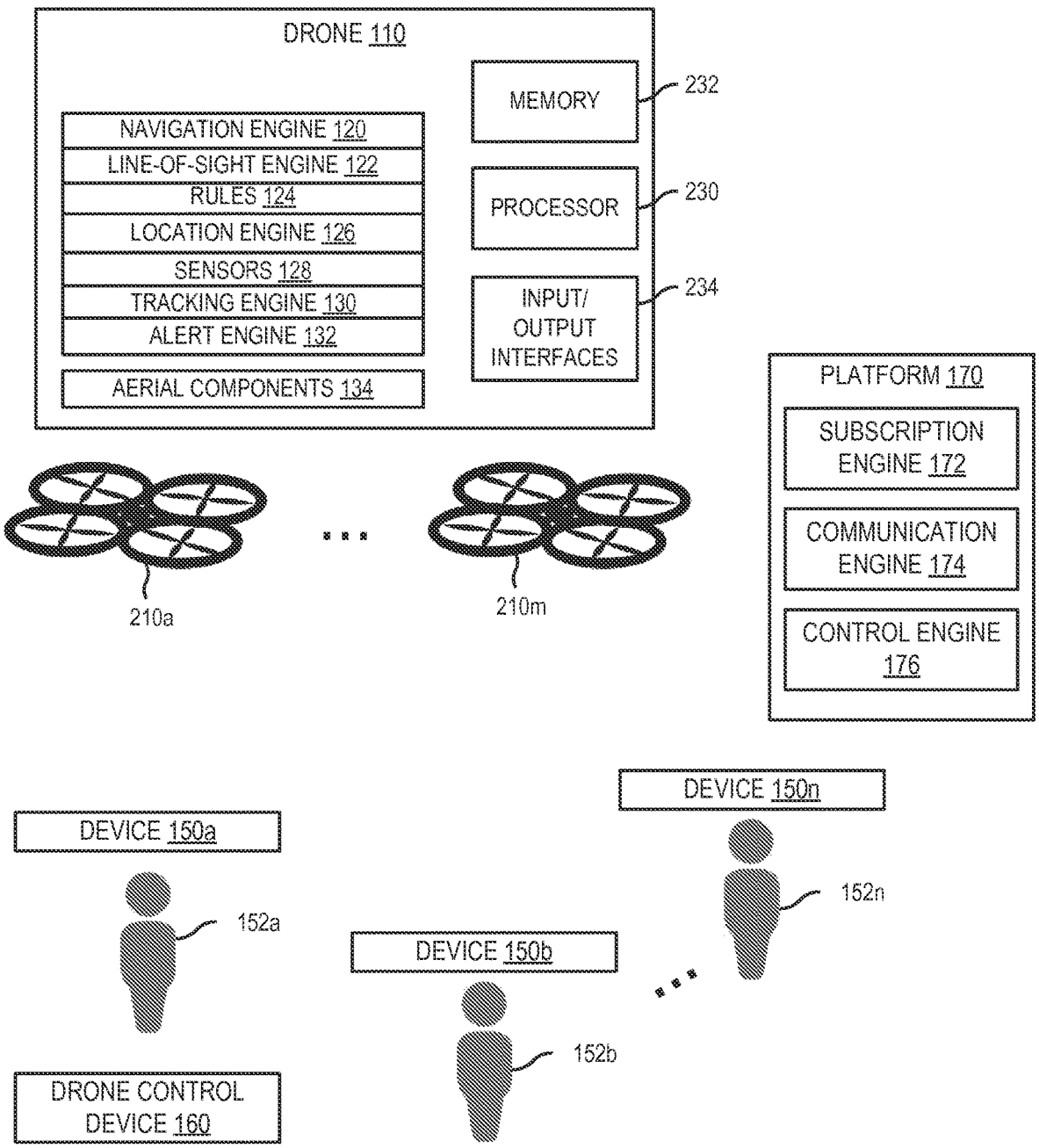
FIG. 2 is a system including drones capable of tracking humans based on devices and control the drone to be within line-of-sight of at least one of the devices, according to an example.

FIG. 2 is a system 200 including drones capable of tracking humans based on devices and control the drone to be within line-of-sight of at least one of the devices, according to an example. In various examples, line-of-sight represents the visibility of a human to the drone. Line-of-sight can be defined by criteria used by the drone. The system 200 can include drone 110 as well as drones 210a-210m, the devices 150 associated with respective humans 152*a*-152*n*, a drone control device 160 to control one or more of the drones 110, 210, and a platform 170 that can provide services based on information provided by the drones 110, 210 and/or devices 150*a*-150*n*. In some examples, the drone 110 can also include rules 124, a location engine 126, sensors 128, a tracking engine 130, an alert engine 132, and aerial components 134. Moreover, the drone 110 may include at least one processor 230, memory 232, and input/output interfaces 234.

The navigation engine 120 can control aerial movement of the drone by using aerial components. In some examples, aerial components 134 can include one or more motors to control moving parts of the drone. For example, the navigation engine 120 can control the motors to turn propellers to control drone movement. Various technologies can be used to implement drone motion (e.g., by creating aerodynamic forces to create lift of the drone). Examples of types of drones can include helicopter drones, quadcopter drones, plane drones, etc. Drones can also come in various sizes. For example, a drone may be a large size (e.g., more than 55 pounds), can be a smaller size (e.g., under 55 pounds) that may be regulated under different rules, and even smaller size (e.g., less than 4.4 pounds), etc. Size examples can vary, and can be determined based on one or more regulations from a government entity (e.g., the Federal Aviation Administration).

The line-of-sight engine 122 can be used to determine whether the drone is within line-of-sight with at least one of the devices 150*a*-150*n* within a physical proximity to a human 152*a*-152*n*. As used herein, physical proximity to a human means that the device is located on the human (e.g., a cell phone in a pocket, a smart device in a hat, a smart watch, a bracelet, smart glasses, etc.). In some examples, the devices are wearable devices. Wearable devices are clothing and accessories incorporating computer or advanced electronic technologies. In some examples, the devices 150*a*-150*n* are located external to the human. For example, a hat may include technology to allow the drone 110 to determine that there is line-of-sight with the human and/or the device 150.

In one example, the device 150 can include global positioning system (GPS) technology. The GPS technology can be used to determine a position of the device. The position can be provided to the drone 110 either directly via input/output interfaces 234 or via a platform 170. In another example, the device 150 may include a locator (e.g., a beacon such as a radio beacon, an infrared beacon, Wi-Fi beacon, etc.). Drones 110, 210 can use the beacon to determine the position of the device 150 and/or human (e.g., via triangulation). In some examples, sensors from multiple drones can be used to triangulate the position of a human. Moreover, a combination of technologies can be used to determine whether the drone 110 has a line-of-sight with the respective devices 150 and/or the associated human 152. For example, the drone 110 may use the GPS or beacon technology to determine the general location of the device and/or human and then use a sensor 128 (e.g., an image sensor, an infrared sensor, etc.) to confirm that there is a line-of-sight between the drone 110 and the respective device and/or human. In some examples, an infrared beacon can be used to confirm line-of-sight.

In one example, the location of the device (e.g., based on GPS coordinates) can be used to determine a place for the drone 110 to look for a human. In this example, the drone 110 can use a sensor 128, such as an optical sensor, to look for a human in that area. Recognition technology can be used to determine whether there is a human in that area. If so, then there is line-of-sight to that human.

In some examples, the device itself can be used for line-of-sight determination in one step. For example, the device can send out a beacon that can be received by the drone 110 if there is line-of-sight (e.g., an infrared beacon). If the drone 110 receives the signal, then there is line-of-sight. These beacons can be configured to provide a signal that lasts a particular range. As such, distance can be taken into account. In some examples, the line-of-sight determination can be based on line-of-sight based communications.

The tracking of the devices/humans can be used for dual purposes. The first purpose is to track the respective humans (e.g., to ensure a location of the humans 152 are within particular parameters). The second purpose is to ensure that drones 110 are within line-of-sight of at least one human.

In some examples, if the line-of-sight engine 122 determines that there is no line-of-sight, the drone 110 can be controlled via the navigation engine 120 to become within line-of-sight of at least one human. Rules 124 can be used to specify, when the drone 110 is not within line-of-sight. For example, the rules 124 can include a rule that specifies distance criteria such as a threshold distance between the drone 110 and the devices. As noted, the location of the devices 150/humans 152 can be determined. Also, the location of the drone 110 can be determined. In some examples, the location of the drone 110 can be maintained using sensors 128 (e.g., accelerometer, gyroscope, compass, GPS, cell tower tracking, other positioning systems, altimeter, thermal sensors, combinations thereof, etc.). The location engine 126 can determine the location of the drone and a location of the respective devices 150. The distance criteria can be a customizable criteria that indicates a distance that can be deemed to be associated with a lack of line-of-sight. In one example, the criteria can take into account a size of the drone 110 and a sighting capability of a human being (e.g., at a particular visual acuity). In another example, the criteria may also take into account dynamic visual controls, such as weather.

If the criteria is satisfied, the particular human and associated device can be considered to possibly lack a line-of-sight with the drone 110. Thus, a line-of-sight determination can be based on the criteria. Further, in some examples, the criteria can be used to determine a potential lack of line-of-sight and another sensor 128 can be used to confirm a lack of line-of-sight. For example, the distance criteria can be used to determine whether there is a potential lack of line-of-sight and an image sensor, infrared sensor, etc. can be used to confirm a lack of line-of-sight or confirm that there is a line-of-sight.

In other examples, three-dimensional maps of the terrain can be used to determine whether the location a human is at has line-of-sight with the drone 110 based on obstructions. This can be based on a land location of the user and any obstructions. In some examples, sensor data (e.g., image data, sonar data, etc.) taken by the drones 110, 210 can be used to determine the three-dimensional maps. In some examples, the three-dimensional map processing can be accomplished at the drones 110. In other examples, the three-dimensional map processing can be off-loaded to a platform 170, such as a cloud system or computing system.

In some examples, rules 124 can include an action to take by the drone 110 based on what criteria has been fulfilled. In one example, the drone 110 can be caused to return to a line-of-sight of at least one of the devices 150 based on a determination of a potential lack of line-of-sight or a confirmed lack of line-of-sight. The rules 124 may further specify where the drone 110 is to go. For example, the drone 110 can be instructed to move to within a certain distance of one of the devices 150 (e.g., a closest one of the devices 150). In other examples, the drone 110 can have a predetermined path to take, a dynamic path to take, a static area to patrol, a dynamic area to patrol (e.g., based on locations of the devices 150), etc. In one example, the drone 110 may be instructed to move to within a certain location or distance from one of the devices 150 within its future path. In some examples, the lack of line-of-sight is based on a determination that one of the devices is within the criteria and the other devices are already determined to lack the line-of-sight.

In one example, one of the rules 124 can specify boundary criteria for the humans 152 and/or devices 150. The tracking engine 130 can determine whether the location of a device meets the boundary criteria. In some examples, the boundary criteria can include a set of location coordinates that can be mapped. The alert engine 132 can determine an alert based on criteria, such as the boundary criteria. If a respective device 150 is outside of the boundary or within a boundary threshold, an alert can be set. The alert can cause the drone 110 to go to the respective device 150.

An example of use of boundary criteria may be to monitor children at a school or playground. If the child moves past the boundary, particular actions can be taken by the drone 110, such as the navigation engine 120 moving the drone 110 towards the child, sending an alert to a user (e.g., registered parent), sending causing video to start recording and target the child, etc. In a similar case, the devices 150 and drones 110, 210 can be used to track inmates.

In another example, the drones 110, 210 can be used for agriculture. The drones 110, 210 can be used to track worker movement while also performing other activities. For example, the drones can be used to spray pesticides, irrigate, etc. over a portion of a field. The devices 150 can be used to ensure that humans 152 are not in the field during spray. Further, the line-of-sight engine 122 can be used to ensure that proper supervision of the drone occurs. In some examples, one or more of the drones 110, 210 can be controlled by a drone control device 160 (e.g., a remote control, a mobile device using an app, etc.).

The rules 124 can be used to implement other functionality. For example, a rule 124 can specify conditions that show that a respective device 150 is not within proximity of an associated human 152. For example, the device 150 may include accelerometer information that can be sent to the drone 110 and/or platform 170. The accelerometer information can be compared to a profile or other function to determine whether anomalous behavior is present. One example of anomalous behavior includes no motion from the device 150. A device 150 located on a human 152 would show some motion (e.g., from breathing). Therefore, the lack of any movement could show that the human 152 is no longer associated with the device 150. The rule 124 can further specify that in response to the condition occurring, the navigation engine 120 controls aerial movement of the drone 110 towards a location of the device 150 and/or human 152 based on the recognition that the device is not within proximity of the human 152.

Other rules can be implemented, for example, to ensure that the drone 110, 210 meets government regulations. In one example, the drone 110, 210 can include an altimeter and the drone 110, 210 can have an altitude range to fly within. In another example, the drone 110, 210 can include rules 124 to keep the drones 110, 210 from flying directly overhead of a human. Rules 124 can be used in conjunction with sensors 128 to provide various navigation adjustments.

In one example, the platform 170 can import government regulations and base the rules based on the government regulations.

In some examples, the platform 170 can be a computing system, such as a cloud computing system that can be used to communicate (e.g., with the drone 110, with devices 150, with other devices, etc.) via a communication engine 174. Various functionality described herein as being performed by the drone 110 can be offloaded to the platform 170. For example, the location of the devices 150a-150n can be determined by the platform 170. Further, information about the drones 110, 210 can be sent to the platform 170 via a communication engine 174. The information can include locations, navigation programming, etc. Moreover, the information from the devices 150 can be sent to the communication engine 174. The information can include location of the devices, other sensor information (e.g., accelerometer information), etc. The platform 170 can perform data analytics on the information to determine whether one or more rules or alerts are triggered. If certain rules are triggered, the control engine 176 can send the drone 110 instructions to move accordingly (e.g., to a device location, within a boundary, etc).

In other examples, if a rule is triggered to alert a user, an alert can be sent to the user. In one example, the subscription engine 172 can be used to register users to a database. The database can include devices 150 and/or humans 152 that the registered user is interested in. If an alert occurs, the user can be sent an alert. In the example of a school setting, the user can be an administrator at the school, a parent, etc. In the prison example, the user can be a warden, a prison guard, etc. Similar examples can be used for tracking others such as elderly people, disabled people, etc. Users can register devices 150 with humans 152 and an alert location (e.g., an email address, a phone number, etc.). When criteria associated with an alert is met, the subscription engine 172 can cause sending of an alert to the alert location. Further, in some scenarios, other information can be provided such as a video feed of the human 152, control over a drone looking for the human, etc.

As noted above, the alerts can be sent to an emergency alert system. As such, the communication engine 174 can use APIs to communicate the alerts to systems associated with the triggered rule. For example, in a rule context of a missing child, an API associated with an Amber Alert system can be used.

With the approaches used herein, multiple drones 110, 210a-210m can be used to monitor multiple humans 152a-152n. The drones 110, 210 can be coordinated via navigation engines and/or a platform 170 that can centralize control. Multiple drones 110, 210 can be used to track humans 152 associated with devices 150 (e.g., wearable devices) as well as to keep within line-of-sight of at least one of the humans 152. This can ensure that the drone is supervised while also ensuring that the humans are tracked.

A communication network can be used to connect one or more of the drones 110, 210, devices 150, platform 170, other devices, etc. The communication network can use wired communications, wireless communications, or combinations thereof. Further, the communication network can include multiple sub communication networks such as data networks, wireless networks, telephony networks, etc. Such networks can include, for example, a public data network such as the Internet, local area networks (LANs), wide area networks (WANs), metropolitan area networks (MANS), cable networks, fiber optic networks, combinations thereof, or the like. In certain examples, wireless networks may include cellular networks, satellite communications, wireless LANs, etc. Further, the communication network can be in the form of a direct network link between devices. Various communications structures and infrastructure can be utilized to implement the communication network(s). Moreover, devices 150 and drones 110, 210 can have multiple means of communication.

By way of example, devices can communicate with each other and other components with access to the communication network via a communication protocol or multiple protocols. A protocol can be a set of rules that defines how nodes of the communication network interact with other nodes. Further, communications between network nodes can be implemented by exchanging discrete packets of data or sending messages. Packets can include header information associated with a protocol (e.g., information on the location of the network node(s) to contact) as well as payload information.

The engines 120, 122, 126, 130, 132, 172, 174, 176 include hardware and/or combinations of hardware and programming to perform functions provided herein. Moreover, the modules (not shown) can include programming functions and/or combinations of programming functions to be executed by hardware as provided herein. When discussing the engines and modules, it is noted that functionality attributed to an engine can also be attributed to the corresponding module and vice versa. Moreover, functionality attributed to a particular module and/or engine may also be implemented using another module and/or engine.

A processor 230, such as a central processing unit (CPU) or a microprocessor suitable for retrieval and execution of instructions and/or electronic circuits can be configured to perform the functionality of any of the engines described herein. In certain scenarios, instructions and/or other information, such as location information, registration information, etc., can be included in memory 232 or other memory. Input/output interfaces 234 may additionally be provided by the drone 110. Moreover, in certain embodiments, some components can be utilized to implement functionality of other components described herein. Input/output devices such as communication devices like network communication devices or wireless devices can also be considered devices capable of using the input/output interfaces 234.

Each of the modules may include, for example, hardware devices including electronic circuitry for implementing the functionality described herein. In addition or as an alternative, each module may be implemented as a series of instructions encoded on a machine-readable storage medium of a computing device and executable by a processor. It should be noted that, in some embodiments, some modules are implemented as hardware devices, while other modules are implemented as executable instructions.

Figure 3:
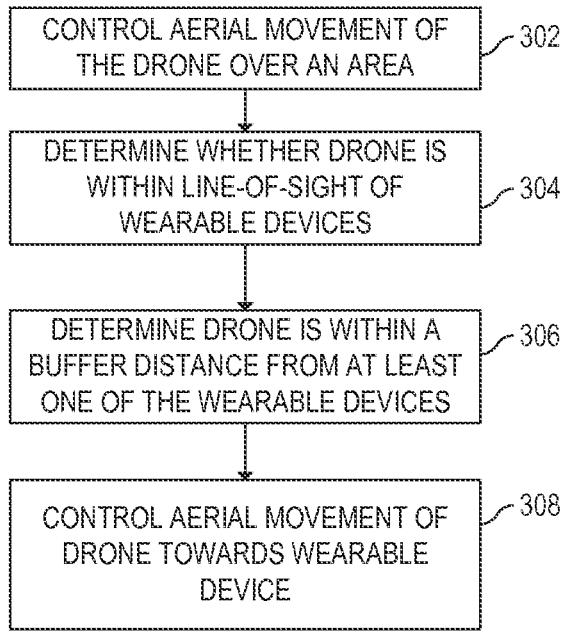
FIG. 3 is a flowchart of a method for controlling a drone to be within a line-of-sight of a human based on a wearable device on the human, where the wearable device is tracked, according to an example.
Figure 4:
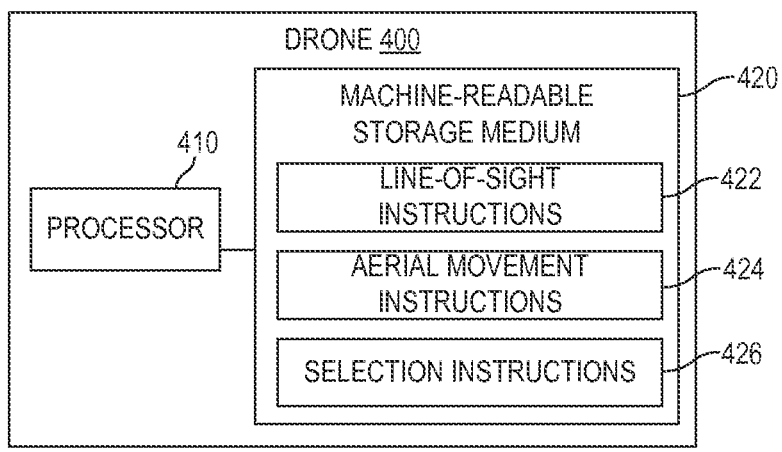
FIG. 4 is a block diagram of a drone capable of tracking humans based on wearable devices and controlling aerial movement of the drone to stay within a line-of-sight of at least one of the humans, according to an example.

FIG. 3 is a flowchart of a method for controlling a drone to be within a line-of-sight of a human based on a wearable device on the human, where the wearable device is tracked, according to an example. FIG. 4 is a block diagram of a drone capable of tracking humans based on wearable devices and controlling aerial movement of the drone to stay within a line-of-sight of at least one of the humans, according to an example.

Although execution of method 300 is described below with reference to drone 400, other suitable components for execution of method 300 can be utilized (e.g., drones 110, 210). Additionally, the components for executing the method 300 may be spread among multiple devices (e.g., part of the functionality may be accomplished on the drone and part of the functionality may be offloaded to a cloud system). Method 300 may be implemented in the form of executable instructions stored on a machine-readable storage medium, such as storage medium 420, and/or in the form of electronic circuitry.

The drone 400 includes, for example, a processor 410, and a machine-readable storage medium 420 including instructions 422, 424, 426 for controlling the drone 400 according to rules and information about wearable devices located on humans.

Processor 410 may be at least one central processing unit (CPU), at least one semiconductor-based microprocessor, at least one graphics processing unit (GPU), other hardware devices suitable for retrieval and execution of instructions stored in machine-readable storage medium 420, or combinations thereof. For example, the processor 410 may include multiple cores on a chip, include multiple cores across multiple chips, multiple cores across multiple devices (e.g., between the drone and a cloud system), or combinations thereof. Processor 410 may fetch, decode, and execute instructions 422, 424, 426 to implement tracking of users with wearable devices and changing aerial movement based on a line-of-sight with one or more of the users/wearable devices. As an alternative or in addition to retrieving and executing instructions, processor 410 may include at least one integrated circuit (IC), other control logic, other electronic circuits, or combinations thereof that include a number of electronic components for performing the functionality of instructions 422, 424, 426.

Machine-readable storage medium 420 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 420 may be encoded with a series of executable instructions for controlling aerial movement of a drone based on a location of a wearable device.

At 302, aerial movement instructions 424 can be executed by processor 410 to control the drone 400 (e.g., by controlling aerial components of the drone). The drone 400 can be controlled using programmed instructions executed by the processor 410. For example, the drone 400 can be set to patrol an area, can be set to follow a pattern, can be set to dynamically alter the patrol or pattern based on conditions (e.g., movement of tracked devices, weather, etc.), or the like. Further, in some examples, the drone 400 can receive other control instructions from a control unit (e.g., a remote control, a remote application on a smart device, etc.).

The drone 400 can be used to track humans using wearable devices. For example, line-of-sight instructions 422 can be executed by processor 410 to determine whether the drone 400 is within a line-of-sight of the wearable device and/or the respective humans (304). The drone 400 can use this information to determine whether the drone 400 is within line-of-sight of at least one of the humans. Further, the drone 400 can track the respective humans using the wearable devices.

At 306, the drone 400 can determine that it is within a buffer distance from one of the wearable devices indicative of a possible lack of line-of-sight to the wearable device and that there is a lack of line-of-sight from the other wearable devices. As used herein, the term "possible lack of line-of-sight" means that the drone does not lack the line-of-sight, but is within the buffer distance and/or the drone does lack the line-of-sight. The determination can be according to a rule and sensor information. In one example, the lack of the line-of-sight of the other wearable devices can be based on location information received from the wearable devices, sensor data captured at the drone, combinations thereof, etc. In one example, a certain distance can be indicative of a lack of line-of-sight. In another example, the distance can be augmented by weather conditions (e.g., fog, cloudiness, etc.). In a further example, the lack of line-of-sight can be determined based on a visual or infrared sensor on the drone 400, laser communication between the drone 400 and wearable devices, etc. In one example, the wearable device is a head device, such as a cap or helmet. The head device can include a beacon that can be used to facilitate the line-of-sight determination.

The buffer distance is a threshold distance that is smaller in value than a distance indicative of a lack of line-of-sight. The buffer distance can be used to cause augmentation of the drone's path before the drone 400 has a lack of line-of-sight from the one wearable device. As such, at 308, the aerial movement instructions 424 can be executed to move the drone 400 towards the wearable device. This ensures that at least one of the many wearable devices is within a line-of-sight of the drone. In some examples, government regulations may specify that a line-of-sight between a human and a drone be maintained.

In one example, one of the wearable devices can be selected based on a triggered rule by executing selection instructions 426. As noted above, such triggers can include the wearer of the wearable device moving outside of a boundary, indications that the wearable device is no longer associated with the wearer, a stoppage of communication from the wearable device, etc. The processor 410 can determine a location of the wearable device (e.g., based on GPS coordinates, other location information, etc.). Aerial movement instructions 424 can be executed to cause the drone 400 to move towards the location. In some examples, the location can be updated and the drone can follow the wearable device. In one example, the wearable device is followed until a manual control signal is received from a control device (e.g., a remote control).

As noted above, alerts can be associated with rules. As such, in one example, when a rule is triggered, an alert can be sent. As noted above, the alert can be sent to registered user devices.

Figure 5:
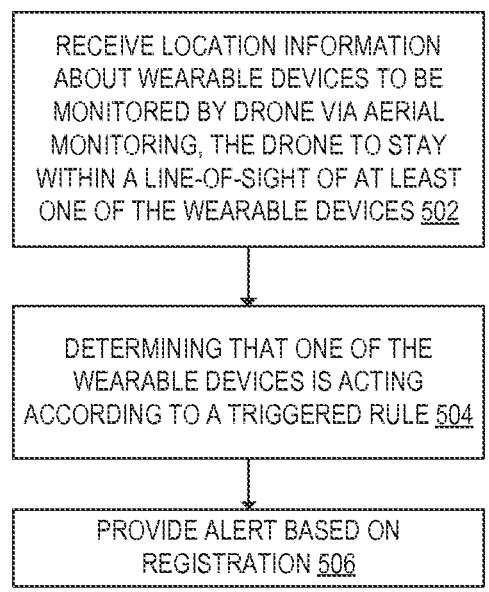
FIG. 5 is a flowchart of a method for controlling a drone to be within a line-of-sight of a human based on a wearable device, where an alert is provided if a rule is triggered based on location information, according to an example.

FIG. 5 is a flowchart of a method for controlling a drone to be within a line-of-sight of a human based on a wearable device, where an alert is provided if a rule is triggered based on location information, according to an example. Although execution of method 500 is described below with reference to a computing system, other suitable components for execution of method 500 can be utilized (e.g., platform 170, other computing devices, cloud computing systems, etc.). Additionally, the components for executing the method 500 may be spread among multiple devices. Method 500 may be implemented in the form of executable instructions stored on a machine-readable storage medium, such as storage medium, and/or in the form of electronic circuitry.

As noted above, a drone can be configured to move throughout a static or dynamic area. The computing system can control the drone's motions (e.g., by sending programming for the drone to execute). At 502, the computing system receives location information about multiple wearable devices that are monitored by a drone via aerial monitoring. The wearable devices can be worn by the respective humans and thus be within a physical proximity to the human. The wearable devices can be registered to alerts. The alerts may include an identifier of the wearable device and/or a human associated with the wearable device, a rule associated with when the alert should occur, and contact information (e.g., an email address, a phone number, Internet address, etc.) to send the alert. As noted above, the alerts can be sent in response to registration for the alerts.

For example, a parent may be interested in tracking their child at school and can have an alert associated with when the child is within a particular distance to/from a school boundary, when the child is a certain distance from a teacher wearing another wearable device, etc. The drone can be controlled to stay within a line-of-sight of at least one of the wearable devices from multiple wearable devices (e.g., wearable devices respectively associated with particular children).

At 504, the computing system determines that one of the wearable devices is acting according to a triggered rule based on the received location information. As noted above, various rules can be used. Further, alerts can be associated with the rules. As such, at 506, when a rule is triggered, the computing system can provide an associated alert for the rule (e.g., based on registration for the alert). For example, the alert can be based on a determination that the wearable device is outside of a boundary associated with the triggered rule based on the location information of the wearable device (e.g., notify a registered user that a child is outside of a school boundary).

In another example, the triggered rule can alert a user that the drone is outside of a line-of-sight of at least one of the wearable devices or is in a buffer distance from at least one of the wearable devices that indicates a possible lack of line-of-sight from the set of wearable devices. In one example, the rule can indicate that if each of the wearable devices is out of the line-of-sight of the drone and/or within a threshold distance away (e.g., at a buffer range), the rule is triggered. The drone can then be controlled to move towards one of the wearable devices. The wearable device to move towards can be selected based on criteria (e.g., the closest wearable device to the drone, a close wearable device within a path the drone is on, etc.). The computing system can send a control command to cause the drone to move towards the selected wearable device.

What is claimed is:
1. A drone comprising:
a navigation engine to control aerial movement of the drone;
a line-of-sight engine to determine, based on a plurality of devices, whether the drone is within a line-of-sight with at least a respective one of a plurality of humans within a physical proximity to a respective one of the plurality of devices,
wherein the devices are used by the drone to track the humans, and
wherein when the drone is determined to lack the line-of-sight, the navigation engine is further to control the aerial movement of the drone to become within the line-of-sight; and
an alert engine to recognize the respective one of the plurality of devices is not within the physical proximity of the respective human,
wherein the navigation engine controls the aerial movement of the drone towards a location of the respective one of the plurality of devices based on recognition that the respective one of the plurality of devices is not within the physical proximity of the respective human.

2. The drone of claim 1, further comprising:
a rule specifying when the drone is not within the line-of-sight, wherein the determination is based on the rule.

3. The drone of claim 2, further comprising:
a location engine to determine a first location of the drone and a second location of the at least one of the devices,
wherein the rule indicates a distance criteria between the first location and the second location; and
wherein the line-of-sight determination is further based on the distance criteria, the first location, and the second location.

4. The drone of claim 3, further comprising:
a sensor to target the second location to confirm the lack of the line-of-sight for the lack of line-of-sight determination.

5. The drone of claim 3, wherein the second location is determined based on at least one of: a radio frequency signal, global positioning system information, and an optical sensor.

6. The drone of claim 3, wherein the devices are wearable devices located on the respective human.

7. The drone of claim 6, further comprising:
a second rule specifying boundary criteria for the respective one of the plurality of devices; and
a tracking engine to track whether the second location meets the boundary criteria,
wherein the navigation engine is further to control the aerial movement of the drone to move towards the respective one of the plurality of devices based on the tracking.

8. A non-transitory machine-readable storage medium storing instructions that, if executed by at least one processor of a drone, cause the drone to:
control aerial movement of the drone throughout an area;
determine whether the drone is within a line-of-sight with at least one of a plurality of humans each respectively within a physical proximity to a respective one of a plurality of wearable devices;
determine that the drone is within a buffer distance, from a first one of the plurality of wearable devices, indicative of a possible lack of the line-of-sight from the first one of the plurality of wearable devices and lacks the line-of-sight with others of the plurality of wearable devices;
recognize the first one of the plurality of wearable devices is not within the physical proximity of the respective human; and
control aerial movement of the drone towards the first one of the plurality of wearable devices based on recognition that the respective one of the plurality of wearable devices is not within the physical proximity of the respective human.

9. The non-transitory machine-readable storage medium of claim 8, further comprising instructions that, if executed by the at least one processor, cause the drone to:
select a second one of the plurality of wearable devices based on a triggered rule;
determine a location of the second one of the plurality of wearable devices; and
control aerial movement of the drone towards the second one of the plurality of wearable devices.

10. The non-transitory machine-readable storage medium of claim 9, further comprising instructions that, if executed by the at least one processor, cause the drone to:
send an alert based on the triggered rule.

11. The non-transitory machine-readable storage medium of claim 10, further comprising instructions that, if executed by the at least one processor, cause the drone to:
follow the second one of the plurality of wearable devices until a manual control signal is received from a control device.

12. A method for a drone, the method comprising:
controlling aerial movement of the drone;
determining, based on a plurality of devices, whether the drone is within a line-of-sight with at least a respective one of a plurality of humans within a physical proximity to a respective one of the plurality of devices;
wherein the devices are used by the drone to track the humans;
when the drone is determined to lack the line-of-sight, controlling the aerial movement of the drone to become within the line-of-sight;
recognizing the respective one of the plurality of devices is not within the physical proximity of the respective human; and
controlling the aerial movement of the drone towards a location of the respective one of the plurality of devices based on recognition that the respective one of the plurality of devices is not within the physical proximity of the respective human.

13. The method of claim 12, wherein determining whether the drone is within the line-of-sight is based on a rule specifying when the drone is not within the line-of-sight.

14. The method of claim 13, further comprising:
determining a first location of the drone and a second location of the at least one of the devices,
wherein the rule indicates a distance criteria between the first location and the second location; and
wherein determining whether the drone is within the line-of-sight is further based on the distance criteria, the first location, and the second location.

15. The method of claim 14, further comprising:
targeting the second location with a sensor to confirm the lack of the line-of-sight for the lack of line-of-sight determination.

16. The method of claim 14, wherein the second location is determined based on at least one of: a radio frequency signal, global positioning system information, and an optical sensor.

17. The method of claim 14, wherein the devices are wearable devices located on the respective human.

18. The method of claim 17, further comprising:
tracking whether the second location meets boundary criteria specified by a second rule for the respective one of the plurality of devices; and
controlling the aerial movement of the drone to move towards the respective one of the plurality of devices based on the tracking.

* * * * *